Oct. 22, 1940.　　　　W. E. WINE　　　　2,218,693
CONTROL MECHANISM FOR EMPTY AND LOAD BRAKE
Filed Oct. 18, 1935　　　4 Sheets-Sheet 1
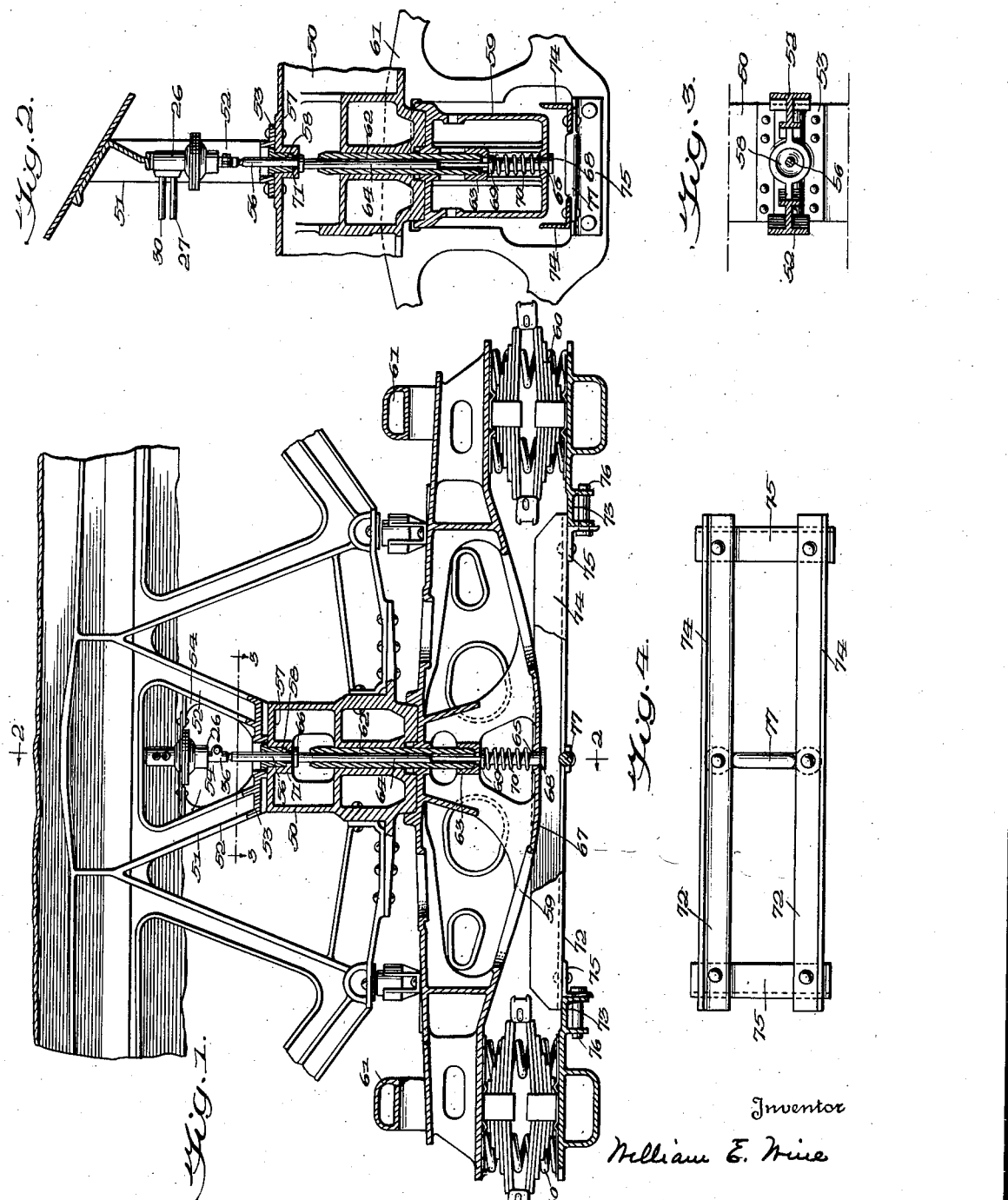
Inventor
William E. Wine
By Ritter, Machlin & O'Neill
his Attorneys Oct. 22, 1940.  W. E. WINE  2,218,693
CONTROL MECHANISM FOR EMPTY AND LOAD BRAKE
Filed Oct. 18, 1935  4 Sheets-Sheet 2
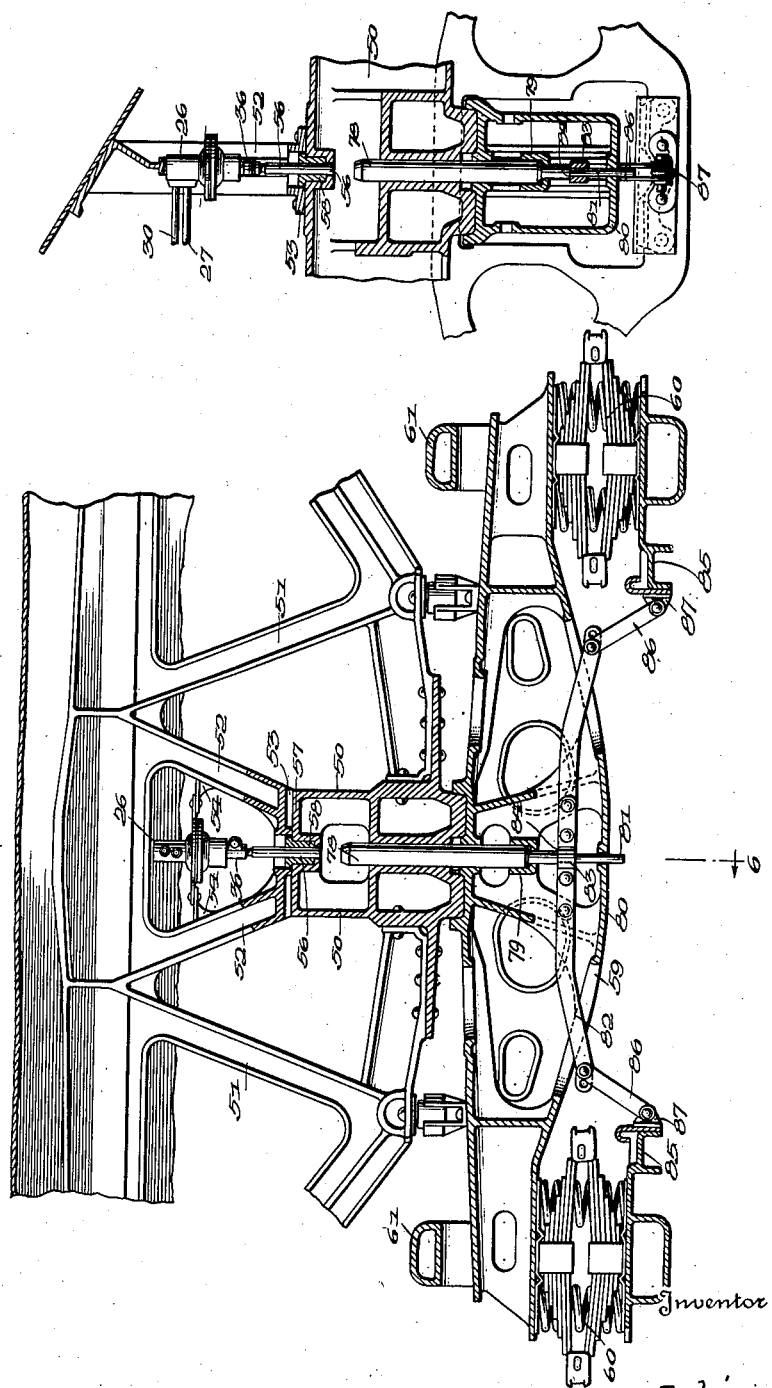

Oct. 22, 1940.　　　W. E. WINE　　　2,218,693
CONTROL MECHANISM FOR EMPTY AND LOAD BRAKE
Filed Oct. 18, 1935　　　4 Sheets-Sheet 3
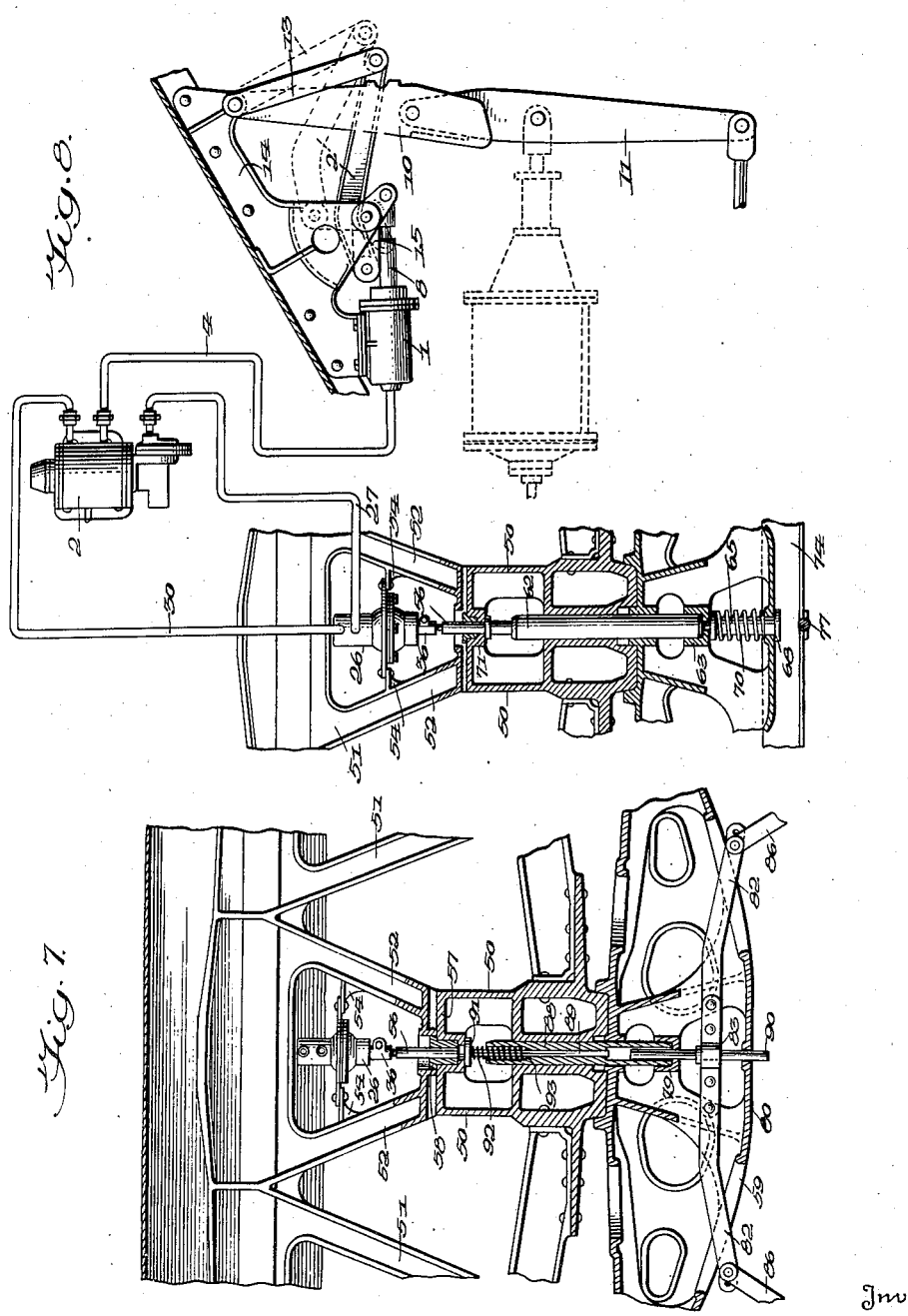
Inventor
William E. Wine
By Ritter, Mechlin & O'Neill
his Attorneys

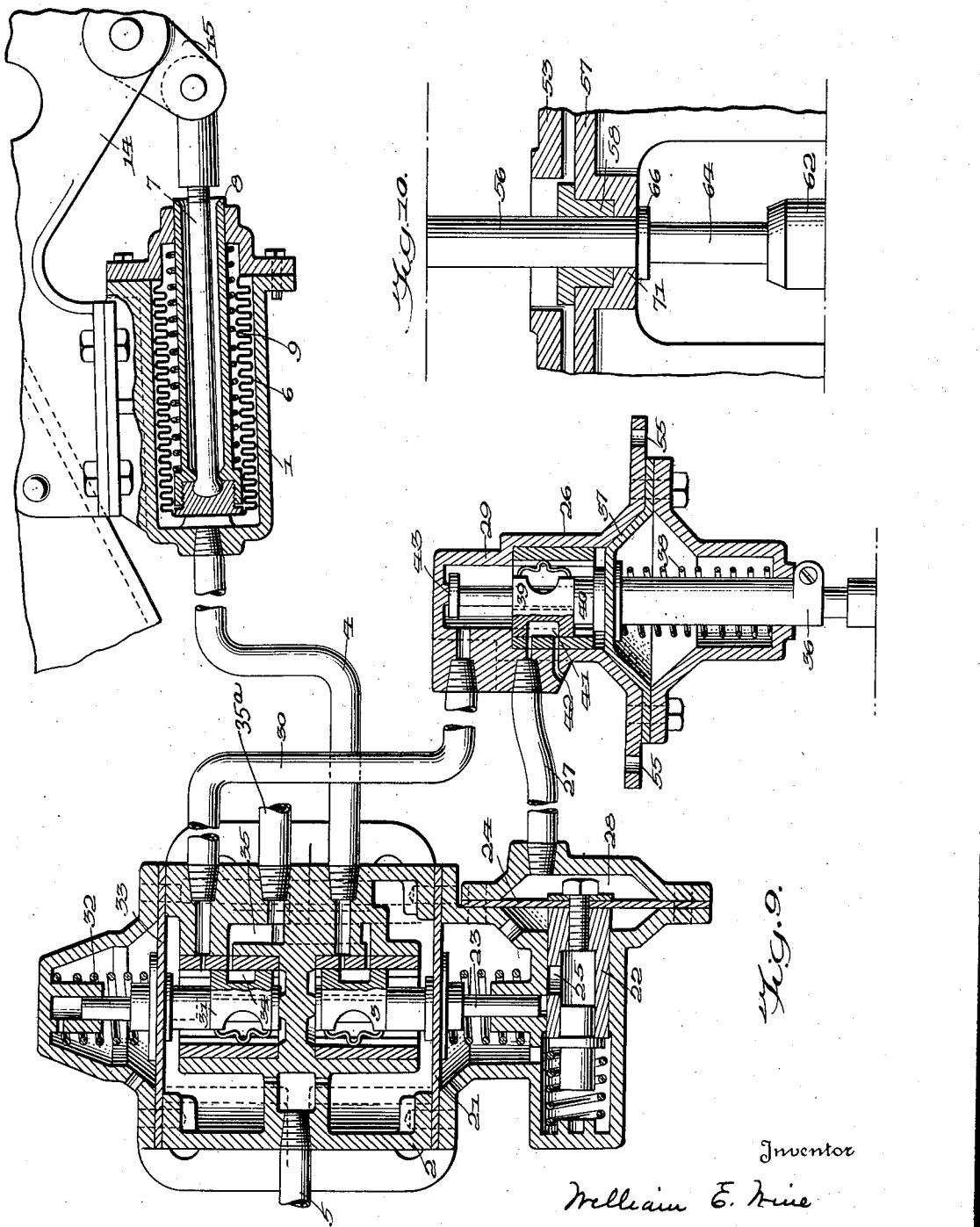

Patented Oct. 22, 1940

2,218,693

UNITED STATES PATENT OFFICE 2,218,693

CONTROL MECHANISM FOR EMPTY AND LOAD BRAKE

William E. Wine, Toledo, Ohio

Application October 18, 1935, Serial No. 45,666

10 Claims. (Cl. 188—195)

My invention relates to railway cars and more particularly to mechanism for varying the braking power of a fluid pressure brake system for railway cars in accordance with variations of the load carried by the car.

The principal object of the invention is to provide a railway car with simple and reliable means which is responsive to variations in the load of the car for cooperating with means controlling the operation of apparatus for varying the braking power of the brake system according to the light or loaded condition of the car.

The primary feature of the invention consists in providing means which is movable in a line substantially coincident with the pivotal axis of one of the trucks of the car for indicating the light or loaded condition of the vehicle.

Other important features of the invention, residing in advantageous forms, combinations and relations of parts will hereinafter appear and be pointed out in the claims.

In the drawings:

Figure 1 is a fragmentary view, partly in section and partly in elevation, illustrating one embodiment of the invention applied to a railway hopper car.

Figure 2 is a vertical sectional view taken on line 2—2 of Figure 1.

Figure 3 is a detail sectional view taken on line 3—3 of Figure 1.

Figure 4 is a plan view of that element forming a part of the embodiment of the invention shown in Figure 1 which is connected to the side frames of one of the trucks of the car.

Figure 5 is a view similar to Figure 1, illustrating another embodiment of the invention.

Figure 6 is a vertical sectional view taken on line 6—6 of Figure 5.

Figure 7 is a view, also similar to Figure 1, illustrating still another embodiment of the invention.

Figure 8 is a diagrammatic view illustrating the manner in which the embodiment of the invention shown in Figure 1 is associated with apparatus for varying the braking power of the fluid pressure brake system of the car, the apparatus being shown in the position it occupies when the car is empty.

Figure 9 is a diagrammatic view illustrating in section the major parts of the apparatus for varying the braking power of the brake system and the valve means for controlling the operation of the apparatus, each part being shown in its normal position which corresponds approximately to the position each assumes when the car is loaded.

Figure 10 is a view, partly in section and partly in elevation, illustrating the lower end of the plunger of the control valve and adjacent portions of a car.

While a railway car of the hopper type has been chosen for purposes of illustrating different embodiments of the invention, those skilled in the art will readily appreciate that the invention is not limited in its application to cars of this particular type.

The apparatus for varying the braking power of the fluid pressure brake system of the car may be of any desired form or construction and the one shown in the drawings is of the type which is particularly adapted to vary the braking power by operating mechanism for changing the leverage ratio of the brake rigging. This particular apparatus, which is described and claimed in my copending application Serial No. 45,665, filed October 18, 1935 includes a fluid pressure operated cylinder 1 and a distributing valve mechanism 2 having a slide valve 3 for controlling the flow of fluid pressure through a pipe 4 to the operating cylinder, the distributing valve mechanism receiving fluid pressure, preferably from the train pipe (not shown) of the fluid pressure brake system, through a pipe 5. The operating cylinder is provided with an expansible and contractible bellows 6 to the inner end of which is secured a rod 7 and a guide sleeve 8 which encircles the rod. Disposed within the cylinder and encircling the sleeve 8 is a helical spring 9 normally tending to maintain the rod and sleeve in their innermost positions within the cylinder. Associated with the operating cylinder 1 is mechanism for varying the braking leverage of the brake rigging (not shown) of the car of the type disclosed and claimed in my copending application Serial No. 8,372, filed February 26, 1935. This mechanism includes a brake lever formed of two sections 10 and 11 and a movable member 12 which, when in one position, enables the sections of the brake lever to act as a substantially rigid unit to transmit a braking force of one magnitude and, when in another position, is adapted to restrain movement of section 10 of the lever, thereby enabling section 11 to move independently of section 10 for transmitting a braking force of a different magnitude. The end of movable member 12 which is cooperable with section 10 of the brake lever is supported by links 13 pivotally connected to a bracket 14 to which the brake lever is also pivotally connected and the opposite end of member 12 is movably connected to the outer end of rod 7 of the operating cylinder by a bell crank lever 15 which is also mounted on bracket 14. It will thus be perceived that, when fluid pressure is admitted to cylinder 1, it is operated to cause member 12 to assume a position restraining movement of section 10 of the brake lever (see Figure 8) but, when there is no fluid pressure in the cylinder, member 12 is maintained, by the action of spring 9 cooperating with rod 7 of the cylinders in a position in which it is incapable of restraining movement of section 10. Thus the braking power of the brake system is changed by operation of cylinder 1.

Slide valve 3 of the distributing valve mechanism 2, which is normally disposed in a position preventing the flow of fluid pressure to the operating cylinder 1, is provided with a diaphragm 21 normally subject to the fluid pressure within the distributing valve mechanism but the valve is normally prevented from being moved to a position enabling fluid pressure to pass through pipe 4 to operating cylinder 1 by a slidable bolt or the like 22, which is disposed in the path of movement of the stem 23 of the valve. Bolt 22 is provided with a pressure responsive diaphragm 24 which, when subjected to fluid pressure, moves bolt 22 to bring an aperture 25, with which it is provided, in register with the valve stem 23. When the bolt is in this position, slide valve 3 is free to be moved by the fluid pressure within the distributing valve mechanism to assume a position enabling the flow of fluid pressure to the operating cylinder 1.

Valve means 26 is provided for controlling the flow of fluid pressure through a pipe 27 to chamber 28 in which diaphragm 24 is located. This control valve means comprises a casing 29 and fluid pressure is supplied thereto through a pipe 30 from the distributing valve mechanism 2, the flow of fluid pressure through pipe 30 being controlled by a slide valve 31. Normally slide valve 31 is maintained by a spring 32 in a position enabling the flow of fluid pressure from the distributing valve mechanism to the control valve but, when the pressure within the distributing valve exceeds a predetermined value, for example, thirty pounds, the force exerted by the spring is overcome and the valve is moved upwardly by a pressure responsive diaphragm 33, with which it is provided, into a position wherein cavity 34 of the valve connects pipe 30 with an atmospheric port 35 which may, if desired, be provided with a pipe 35a in open communication with the atmosphere.

The control valve 26 is provided with a slidable plunger 36 having a pressure responsive diaphragm 37 which, during the interval fluid pressure is supplied to the control valve, is adapted to actuate the plunger. A spring 38 is provided for returning the plunger to an inoperative position after fluid pressure has been exhausted from the casing 29 and cooperable with the plunger and slidable relatively thereto is a valve 39 for controlling the flow of fluid pressure through pipe 27 to chamber 28. The plunger is formed with spaced shoulders, one of which, designated 40, is adapted to engage the valve upon return of the plunger to inoperative position to maintain it in a position wherein cavity 41 of the valve connects pipe 27 to an atmospheric port 42 and the other one of which, designated 43, is adapted upon actuation of the plunger by the fluid pressure to engage valve 39 and move it into a position permitting the flow of fluid through pipe 27 to the chamber 28. It will, therefore, be evident that the flow of fluid pressure through pipe 27 into chamber 28 to cause bolt 22 to assume a position enabling slide valve 3 to be actuated so as to enable fluid pressure to pass through pipe 4 and thus actuate operating cylinder 1, depends upon whether plunger 36 of the control valve moves sufficiently far to cause valve 39 to uncover the port communicating with pipe 27. Accordingly, the extent of movement of the plunger controls the operation of the apparatus for varying the braking power of the brake system.

The present invention pertains to mechanism which reflects or indicates the light or loaded condition of the car and which is adapted to cooperate with plunger 36 of the control valve for limiting, in accordance with variations of the load in the car, the extent of movement of the plunger. In general, this mechanism comprises means relatively movable with respect to the car body in a line substantially coincident with the pivotal axis of one of the car trucks and a device connected to an unsprung portion of the car, such as the side frames of the car truck, for cooperating with said means.

In the various figures illustrating different embodiments of the invention, 50 designates the center sill of the car and 51 the body bolster. Each of these parts may be conveniently formed as integral castings and the portion of the body bolster which is disposed above the center sill is provided with two downwardly extending strut members 52 which are integrally connected at their lower ends by a plate portion 53 overlappingly secured to the top of the center sill. The control valve 26 is preferably disposed so that the plunger 36 thereof will move in a line substantially coincident with the pivotal axis of one of the car trucks and it may advantageously be disposed in the space between the struts 52 of the body bolster. To afford convenient means by which the control valve may be secured to the body bolster in the desired position, the struts 52 are formed, preferably integrally, with inwardly projecting brackets 54 to which laterally projecting lugs 55 of the control valve may be secured. Detachably secured to the lower end of the plunger and constituting a continuation thereof is a rod 56 or the like which extends downwardly through openings in the plate portion 53 of the body bolster and the top wall 57 of the center sill. Disposed within the opening in the top wall of the center sill is a collar or sleeve 58 for guiding the rod 56 of the control valve plunger. This collar is readily removable to enable the control valve to be easily assembled with the body bolster, the assembly being accomplished by arranging the collar on rod 56 as far up as possible before the control valve is placed in the body bolster and then, after the control valve is positioned so that the rod 56 projects into the opening in the top wall of the center sill, permitting the collar to drop downwardly into its proper position in the top wall of the center sill.

The parts of the car truck illustrated in the drawings are, in the main, of conventional design and include a bolster 59 supported at its opposite ends by spring devices 60 in side frames 61. As is customary, the center sill and truck bolster are provided with cooperating parts forming a center plate construction and they are each provided with registering openings for receiving a center pin or king pin by which the truck is pivotally connected to the car.

In the form of the invention illustrated in

Figures 1 to 4, inclusive, and also in Figure 8, the center pin 62, which is supported within a socket 63 of the truck bolster, is provided with an axial bore for slidably receiving means adapted to project beyond opposite ends of the center pin. This means, instead of being formed as a single continuous member or rod, is, for convenience of assembly, formed in two abutting sections, an upper section 64 and a lower section 65. The upper end of the upper section, which projects beyond the top of the center pin, is provided with an enlarged head 66 and the lower end of the lower section, which projects through an opening in the bottom wall 67 of the truck bolster, is provided with an enlarged head 68. Encircling the lower portion of the lower section 65 and interposed between an annular flange 69 formed on the latter and the bottom wall of the truck bolster is a helical spring 70 for normally maintaining the two sections of the rod in their uppermost positions, the head 66 on the upper section being in engagement with a portion 71 of the top wall of the center sill in which the collar 58 is disposed and the head 68 at the lower end of the lower section being in engagement with the under side of the bottom wall 67 of the truck bolster.

Disposed beneath the truck bolster and extending longitudinally thereof is a rigid member 72 which is secured at its opposite ends, by any suitable means, to laterally projecting parts 73 of the spring seat portions of the side frames. This member may be conveniently of skeleton form having side pieces in the form of angle bars 74 which are connected in spaced relation slightly inwardly of their ends by end pieces 75 which may also be in the form of angle bars. The side angle bars 74 are each arranged so that one leg thereof is disposed in a substantially horizontal plane and the other leg extends upwardly therefrom in a substantially vertical plane spaced slightly outwardly from the adjacent side wall of the bolster. The end angle bars 75 are each arranged so that one leg thereof may be secured to the under side of the horizontal legs of the side angle bars and the other leg may extend downwardly for connection, as by pins 76, to the lateral projections 73 of the adjacent side frame.

Intermediate their ends, the side angle bars 74 are connected by a transversely extending rod or the like 77, which is so arranged as to be directly beneath the lower end of rod section 65. It, therefore, constitutes a stop for arresting downward movement of the rod sections 64 and 65 which are adapted to be actuated in this direction by the control valve 36. Moreover, since the stop member 77 is carried by an unsprung part of the car and the body bolster and all parts of the car supported thereby are carried on the spring devices 60, the distance between the lower end of rod 65 and the stop member will vary in accordance with variations of the load within the car. It will be evident that, when the car is empty, there will be a greater distance between the lower end of rod 65 and stop member 77 than when the car is loaded. Rods 64 and 65 may, therefore, move a greater distance when the car is light or empty than when it is loaded and they, therefore, together with the stop member 77 constitute means indicating the loaded condition of the car and limiting or controlling the extent of movement of the plunger of the control valve in accordance with variations in the load.

The rods 64 and 65 are so proportioned and the stop member 77 is so arranged with respect to the rods that, when the car is light or empty, the plunger of the control valve may move sufficiently to actuate valve 39 to uncover the port communicating with pipe 27 and thus permit slide valve 3 to assume a position enabling the flow of fluid pressure into operating cylinder 1. When, however, the car is loaded and the distance between the lower end of rod 65 and stop member 77 has, therefore, decreased, the plunger is prevented from moving a sufficient distance to actuate slide valve 39.

Instead of providing the center pin with a relatively movable means, as in the embodiment of the invention just described, it is contemplated to have the king pin itself relatively movable with respect to the truck bolster, as shown in the embodiment of the invention illustrated in Figure 6. In this embodiment, the center pin is indicated by the reference numeral 78 and extending through aligned openings in the socket 79 in which the lower end of the center pin is disposed and in the bottom wall 80 of the truck bolster, is a pin or rod 81 engaging the lower end of the center pin.

While a member similar to member 72 illustrated in the preferred embodiment of the invention may be employed for inducing relative movement between the center pin and body bolster upon movement of the latter with respect to the side frames, means including an elongated member 82 may be conveniently employed for this purpose. Member 82 is disposed within the bolster and adjacent its central portion, it is formed with an eye or the like 83 through which the lower end of rod 81 extends. This lower portion of rod 81 is of reduced cross sectional area to provide a shoulder or the like 84 by which the member 82 supports the rod. The end portions of member 82 which may, if desired, project below the truck bolster through openings usually found in the bottom wall thereof are connected to the lateral projections 85 of the side frames by links 86. These links are pivotally connected to member 82 and also to brackets 87 secured in any suitable manner as by rivets to the projections 85 of the side frames.

It will be observed that a spring similar to spring 70 in the preferred embodiment of the invention is not employed in the embodiment shown in Figures 5 and 6, so that, instead of the center pin 78 and its cooperating rod 81 being maintained in an elevated position and, therefore, not subject to constant relative movement with respect to the truck bolster, they are supported at all times by member 82. Thus whenever the truck bolster moves up or down, due to the variation of the load within the car, member 82 induces relative movement between the center pin and the bolster. The distance between the upper end of the center pin and the lower end of rod 56 of the control valve plunger 36 will, therefore, vary as the load within the car varies.

One of the principal advantages of the form of the invention illustrated in Figures 5 and 6 is that the member which supports or affords a stop for the means cooperable with the control valve plunger is housed within the truck bolster where it will be protected from injury. Another advantage residing in this embodiment of the invention is that the side frames of the truck are not rigidly connected by the load indicating means.

In the form of the invention illustrated in Figure 7, a center pin 88 of the type having a longitudinal bore is employed. Extending into the bore of the center pin are two slidable rods 89 and 90. The upper rod 89 is provided with an enlarged head 91 and encircling the rod below the head is a spring 92 for normally maintaining the head in engagement with the top of the center sill 50, the spring extending within the center pin and seating against an annular shoulder formed in the upper end of the latter.

The upper end of the lower rod 90 extends within the bore of the center pin and the lower end thereof projects through an opening formed in the bottom wall of the truck bolster. Intermediate its ends this rod is provided with an annular shoulder or the like 93 for cooperating with suitable mechanism, such as the member 82 and links 86, shown in Figures 5 and 6, for inducing relative movement between the rod and the truck bolster.

It will be apparent that, as the load in the car varies, the distance between the lower end of the upper rod 89 and the upper end of the lower rod 90 will also vary. Thus a greater distance will intervene between adjacent portions of these rods when the car is empty than when the car is loaded. It will, therefore, be appreciated that the extent of movement of the plunger of the control valve is limited or controlled by the mechanism illustrated in Figure 7 in substantially the same manner as the mechanism illustrated in the two other forms of the invention effect this result.

From the foregoing, it will be evident that simple and reliable means, necessitating only very slight alteration of existing equipment, has been provided to indicate the load within the car and to regulate or control, in accordance with variations in the load, apparatus for varying the braking power of the brake system.

What I claim is:

1. In a railway car having a fluid pressure brake system provided with apparatus for varying the braking power of the system according to the light or loaded condition of the car, the combination with a center sill having a top wall provided with an opening therein, of a truck pivoted to the center sill and having a spring supported bolster, valve means for controlling operation of said brake apparatus including a member extending within the opening in the center sill and movable different distances according to the light or loaded condition of the car, and mechanism for controlling the extent of movement of said member including means extending within the truck bolster and relatively movable with respect thereto in a line substantially coincident with the pivotal axis of the truck.

2. In a railway car having a fluid pressure brake system provided with apparatus for varying the braking power of the system according to the light or loaded condition of the car, the combination with a center sill having a top wall provided with an opening therein, of a body bolster, a truck pivoted to the car and having a spring supported bolster, valve means rigidly secured to the body bolster for controlling operation of said apparatus, said valve means including a member extending within the opening in the center sill and movable different distances according to the light or loaded condition of the car, and mechanism for controlling the extent of movement of said movable member including means relatively movable with respect to the truck bolster in a line substantially coincident to the pivotal axis of the truck.

3. In a railway car having a fluid pressure brake system provided with apparatus for varying the braking power of the system according to the light or loaded condition of the car, the combination with a center sill, a body bolster having a portion overlappingly secured to the top of the center sill, said portion of the bolster and the top of the center sill being provided with registering openings, a truck pivoted to the center sill and having a spring supported bolster, valve means for controlling operation of said brake apparatus including a member extending within said openings of the body bolster and center sill and movable different distances according to the light or loaded condition of the car, and mechanism for controlling the extent of movement of said movable member including a member relatively movable with respect to the truck bolster in a line substantially coincident with the pivotal axis of the truck.

4. In a railway car having a fluid pressure brake system provided with apparatus for varying the braking power of the system according to the light or loaded condition of the car, the combination with a center sill, of a body bolster having spaced strut members extending downwardly toward and secured to the top of the center sill, a truck pivoted to the car and having a spring supported bolster, valve means for controlling the operation of said brake apparatus disposed within the space between said strut members and rigidly secured to the body bolster, said valve means including a member movable different distances according to the light or loaded condition of the car, and mechanism for controlling the extent of movement of said movable member including a member relatively movable with respect to the truck bolster in a line substantially coincident with the pivotal axis of the truck.

5. In a railway car having a fluid pressure brake system provided with apparatus for varying the braking power of the system according to the light or loaded condition of the car, the combination with a truck pivoted to the car and having a spring supported bolster, of valve means for controlling operation of said apparatus including a member movable different distances according to the light or loaded condition of the car, and mechanism for controlling the extent of movement of said movable member, said mechanism including a center pin pivotally connecting the truck to the car, and means for inducing relative movement between the center pin and the truck bolster.

6. In a railway car having a fluid pressure brake system provided with apparatus for varying the braking power of the system according to the light or loaded condition of the car, the combination with a truck pivoted to the car and having a spring supported bolster, of a longitudinally movable center pin for pivotally connecting the truck to the car, of valve means for controlling operation of said apparatus including a member movable different distances according to the light or loaded condition of the car, said center pin being engageable by said movable member and constituting means for limiting movement thereof, and means disposed beneath the center pin for inducing relative movement between the truck bolster and the center pin.

7. In a railway car having a fluid pressure brake system provided with apparatus for varying the braking power of the system according to the light or loaded condition of the car, the combination with a truck pivoted to the car and having side frames and a spring supported bolster, of valve means for controlling operation of said apparatus including a member movable different distances according to the light or loaded condition of the car, and mechanism for limiting movement of said movable member, said mechanism including a member relatively slidable with respect to the bolster in a line substantially coincident with the pivotal axis of the truck, and means connected to the side frames of the truck and having a portion disposed inside of said bolster affording a stop limiting movement of said slidable member in one direction.

8. In a railway car having a fluid pressure brake system provided with apparatus for varying the braking power of the system according to the light or loaded condition of the car, the combination with a pivoted truck having side frames and a spring supported bolster, of valve means for controlling operation of said apparatus including a member movable different distances according to the light or loaded condition of the car, and mechanism for controlling the extent of movement of said movable member, said mechanism including a member relatively slidable with respect to the truck bolster in a line substantially coincident with the pivotal axis thereof, a member extending longitudinally of the truck bolster and having a portion disposed therein cooperable with the slidable member for limiting movement thereof in one direction, and means pivotally mounted on said longitudinally extending member adjacent opposite ends thereof for connecting the latter to the truck side frames.

9. In an empty and load brake apparatus, the combination with a vehicle truck having a fixed part and a truck bolster movable vertically relative to said fixed part of the truck, of a vehicle body comprising a body bolster having pivotal connection with said truck bolster, a floor support carried by said body bolster, means mounted on said floor support operative to effect the conditioning of an empty and load brake equipment for either light or heavy braking, and means extending through the center of the pivotal connection between the body and truck bolsters adapted to cooperate with said fixed part of the truck to control the operation of the first mentioned means according to the load carried by the vehicle body.

10. In an empty and load brake apparatus, the combination with a vehicle truck having a fixed part, and a part movable vertically relative to said fixed part, of a vehicle body carried by the vertically movable part of the truck, said vehicle body comprising a body bolster and a floor support carried by said body bolster, and means carried by said floor support and adapted to cooperate with said fixed part of the truck to effect the conditioning of an empty and load brake equipment for either light or heavy braking according to the load carried by the vehicle body.

WILLIAM E. WINE.